July 18, 1967 P. SAMMARCO 3,331,607
AGRICULTURAL APPARATUS
Filed June 28, 1965
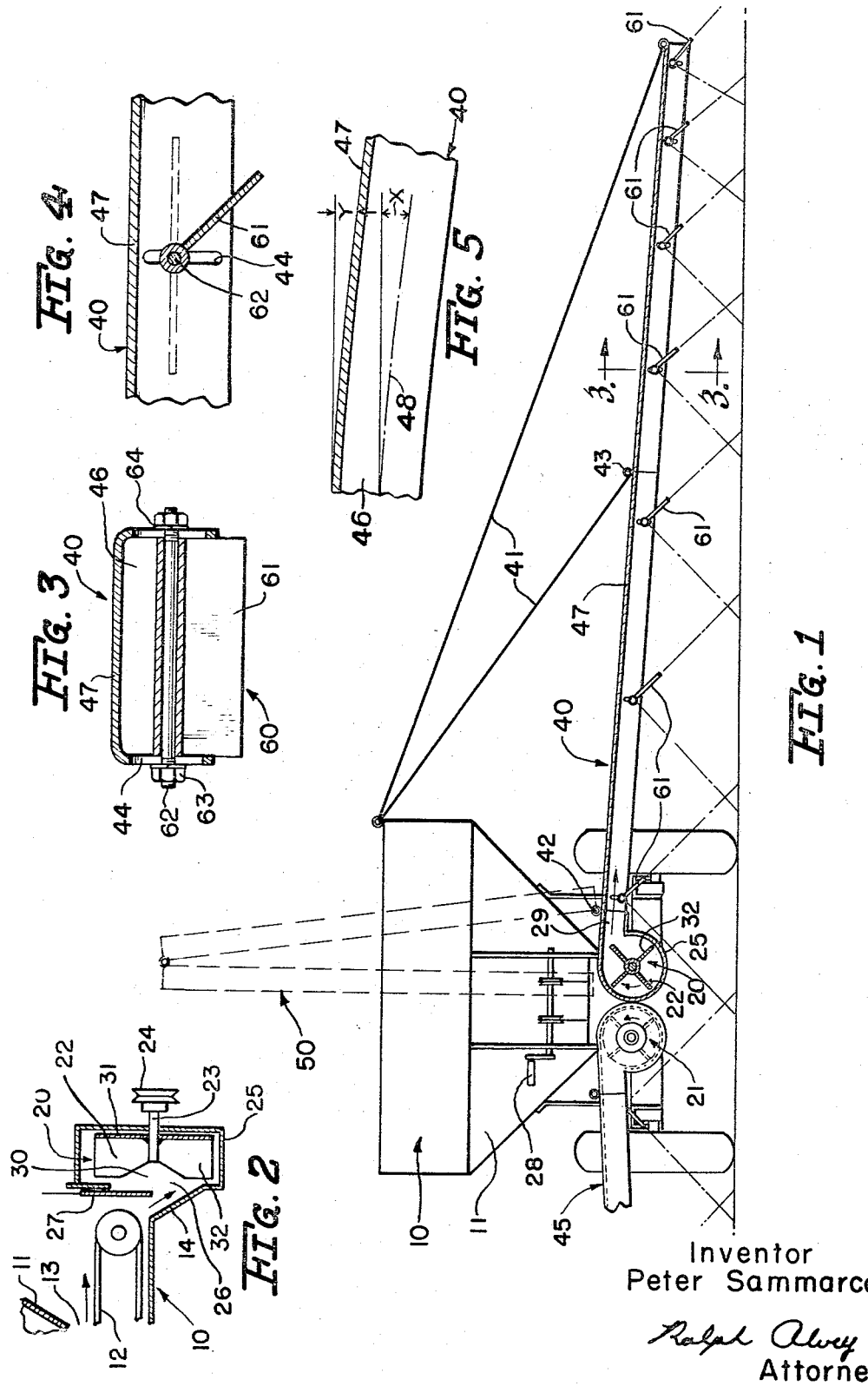
Inventor
Peter Sammarco
Ralph Alvey
Attorney

United States Patent Office 3,331,607
Patented July 18, 1967

3,331,607
AGRICULTURAL APPARATUS
Peter Sammarco, Bellwood, Ill., assignor to International Harvester Company, a corporation of Delaware
Filed June 28, 1965, Ser. No. 467,349
9 Claims. (Cl. 275—14)

This invention pertains to material spreaders. In particular, the invention comprises a distributor conduit for attachment to the discharge of a material spreader unit, the conduit having a system of deflectors for producing a uniform spread of material on the ground.

Prior art material spreader wagons use vertically disposed, rotary impeller units for throwing the material and a distributor conduit for directing the material particles to the side of the wagon. An inherent limitation of such vertically disposed impeller units is the poor spread pattern that they produce. Although the spread pattern is improved by use of the distributor conduit, the pattern still falls short of being satisfactory. Sufficient irregularities remain that some ground areas are starved of fertilizer; while other ground areas are smothered of fertilizer. Since both conditions are harmful to crop growth, some means must be provided to produce an even spread of material.

Objects

The general object of this invention is to provide a means that enables a vertically disposed spreader with a distributor conduit to produce an even spreading pattern. A specific object of this invention is to provide a conduit for directing the fertilizer to the side of the fertilizer cart, wherein the conduit curves in accordance with the standard formula for the segmental, parabolic path of a thrown, free falling particle. A further specific object of this invention is to provide a distributor conduit with means for "skimming off" varied quantities of fertilizer at points along the conduit, the means comprising a series of slanting deflector blades in which each succeeding blade of the series extends further into the conduit, so that material is skimmed in increments from the bottom of the stream of fertilizer and deposited on the ground in a uniform pattern.

Drawings

The preferred mode of the present invention is shown in the drawings, wherein:

FIG. 1 is an elevation showing a pair of distributor conduits mounted on a fertilizer cart, one conduit being shown in section;

FIG. 2 is a section through one of the impeller units, showing how the fertilizer is unloaded from the cart into the impeller unit housing;

FIG. 3 is a section through the conduit taken on line 3—3 of FIG. 1;

FIG. 4 is an enlarged view of one of the deflector stations of FIG. 1, showing the alternate positions of the deflector blade; and FIG. 5 is an enlarged view of a portion of the distributor conduit showing the curvature of the top side thereof.

Description

A common form of fertilizer distributor comprises (FIG. 1) a fertilizer cart 10 for transporting a load of fertilizer, and a pair of laterally extending fertilizer distribution means 40 and 45 for spreading fertilizer to the left and right of the cart. Each distribution means 40 and 45 comprises an impeller unit 20 or 21 for imparting kinetic energy to the fertilizer particles, and a distributor conduit such as 47 for directing the fertilizer to the rear and sides of the cart 10.

Fertilizer cart 10 (see U.S. Patent No. 3,075,777) has a hopper 11 for carrying a load of dry fertilizer. A conveyor 12 (FIG. 2) extending lengthwise of hopper 11 removes dry material from the bottom of the hopper and moves it through the discharge opening 13 at the rear of the hopper. The material falls down surface 14, past inlet gate 27, through inlet 26 of the impeller unit 20, and into impeller housing 25.

Impeller unit 20 is a centrifugal type device for imparting kinetic energy to the fertilizer particles. The basic components of impeller unit 20 are a scroll housing 25, and a paddle wheel impeller 22. Material inlet 26 (FIG. 2) of housing 25 is controlled by a gate 27, winch 28 being used to raise and lower gate 27 to vary the flow of fertilizer into the housing. Separate gates can be used for each of the impeller units 20 and 21 if desired. Discharge of dry fertilizer from housing 25 is through outlet 29 (FIG. 1).

Paddle wheel impeller 22 comprises a circular disk 31 (FIG. 2) having several flat blades 32 attached to it. Disk 31 is, in turn, attached to shaft 23, which is journaled in bearings (not shown) carried by housing 25. Blades 32, can of course, have other forms, such as a cup shape. Shaft 23 is driven by any suitable source of power, for example, a belt drive and pulley 24. The forward edges of the blades 32 of paddle wheel 22 are notched at 30 to facilitate flow of material to the center of impeller blades to provide a more even discharge pattern, i.e. to enable a portion of the material to reach the middle and far side of the paddle wheel blades so that the entire blade acts on the material. Notches 30 are located at the so-called "eye" of the impeller—the region thereof having the greatest suction effect. Impeller unit 21 is identical to impeller unit 20, except that unit 21 is of opposite hand, i.e. rotates and discharges in the opposite direction.

Distributor conduit 47 (FIGS. 1, 3, 4) attached to the discharge outlet 29 of impeller unit 20, conveys the fertilizer particles to the side of the cart 10 and directs the particles to the ground in a uniform pattern. The conduit 47 (FIG. 3) has a flat, U-shaped cross section, with the U opening downward. Conduit 47 (FIG. 1) is attached to the housing 25 with the hinge 42 and is split into two sections hinged together at 43. This hinged construction permits conduit 47 to be folded upward to the dotted line position 50 (FIG. 1) during transport. Guide wires 41 (FIG. 1) support conduit 47 from the side of cart 10 when the conduit is in use.

The top wall of conduit 47 (FIG. 5) is curved to conform to the parabolic trajectory 48 of the particle stream, the trajectory being caused by the action of gravity on the particles. From the velocity of the particles leaving impeller 22, both the time required for a particle to reach a point along conduit 47 and the distance the particle has fallen because of gravity can be determined from the basic formulas for the motion of a body. The fall X of a particle at a particular point along the conduit equals the distance that the top of the conduit should be lowered from the horizontal at that point. The curvature of the top of conduit 47 is determined by calculating the fall X at several points along the proposed conduit. By curving the top of conduit 47 in this manner, a more accurate control is maintained over the quantity of material skimmed off at each deflector.

Located at points along the length of conduit 47 are a plurality of deflectors 60 (FIG. 1, 3, 4). Each deflector 60 comprises a plate 61 having a cylindrical portion at its upper end for mounting the plate on a pin 62. The ends of the pin 62 ride in the vertical slot 44 formed in each side wall of conduit 47 (FIG. 3), are threaded, and carry a washer and nut 63. Thus, each blade can be adjusted vertically and radially about the axis of pin 62 and along slot 44 and fixed in selected position by tightening of the nuts 63 to bear against the wall of conduit 47.

The deflectors 61 skim particles from the bottom of the material stream flowing outward in the conduit passage 46. The extent of penetration of a deflector into the passage 46 controls the volume of particles diverted by the deflector. The deflector closest to the impeller unit 20 protrudes the smallest distance into the passage 46 and each succeeding deflector in an outboard direction along the conduit 47 extends slightly further into the conduit passage. Such a stepped arrangement of the deflectors is necessary so that the stream of fertilizer can travel the full length of the conduit. The first deflector skims a quantity of fertilizer from the bottom of the fertilizer stream, thinning the stream. The second deflector, which projects further into the conduit body than the first deflector, cuts another layer from the particle stream, thinning it more. The third deflector, which extends still further into the conduit passage 46 than the first and second deflectors, cuts still another layer from the particle stream, thinning it more. This action is repeated at each deflector, until the outboard end of the conduit body is reached, where the last fertilizer particles are diverted. The deflector 61 diverts particles in two ways, that is, causes them to both ricochet and deflect on contact with a deflector plate. Light particles of course drop out of the fertilizer stream sooner than heavy particles.

Radial adjustment of the deflectors (FIG. 4) is provided to vary the angle of deflection and to allow a deflector to be taken out of use by being positioned parallel to the stream of material. Radial adjustment controls, therefore, the size of the spread pattern produced. While only one form of pivot is shown, other forms may also be used. The several deflectors 61 are set at different angles, the deflectors closer to the impeller unit being set at sharper angles than the deflectors further out on the conduit, as condition warrants, to achieve a uniform spread.

The space separating adjacent deflector 61 (FIG. 1) is not equal but diminishes in steps towards the outboard end of conduit 47. Thus, deflectors towards the end of conduit 47 are closer together than those located near the cart 10. The unequal spacing of the deflectors is required because conduit 47 slopes downward in an outboard direction in accordance with the trajectory of the stream of particles, thereby moving the outboard deflectors 61 closer to the ground than the inboard deflectors. Since particles deflected by the outboard deflectors leave conduit 47 at points closer to the ground, they spread over a smaller area. To cover the entire area along the length of the conduit 47, i.e. to avoid bare spots, it is necessary to locate the deflectors closer together at the end of conduit 47. The number of deflector blades 61 used and the spacing thereof depends upon such factors as the discharge head of the impeller unit 20 and the length of conduit 47.

While distributor means 40 has been described above as part of a dry fertilizer spreader, it can be used as well with a liquid fertilizer cart. In that case, a slurry is used in lieu of dry fertilizer and a liquid pump is used in lieu of paddle wheel impeller unit 20.

The above description covers only the preferred mode of the invention. The invention is not, however, limited to that mode but embraces all equivalent forms that fall within the spirit and scope of the attached claims. Specific details are given as illustrations only and are not to be construed as limitations of the invention.

What is claimed is:
1. A distributor conduit for a material spreading wagon having a spreader unit mounted thereon, said conduit comprising: an elongated, hollow body forming a passageway for the flow of a stream of material particles, said body having an inlet at one end for the admission of said stream into said passageway and an open, elongated side normally on the lower side thereof for the discharge of said stream in a downward direction; means on said conduit adjacent said inlet for attaching said conduit to the material discharge of a spreader unit; means on said conduit for supporting it from a material wagon; a plurality of deflector units spaced along said passageway in a direction away from said inlet, each of said deflector units generally extending into said passageway a different distance.

2. A distributor conduit as recited in claim 1, wherein: said conduit body has a U-shaped cross section and the base of said U forms the top wall of said passageway, and said top wall is formed parabolically lengthwise thereof to compensate for the gravitational fall of said particle stream.

3. A distributor conduit as recited in claim 2, wherein: each of said deflector units extends into said passageway a different distance than the other of said deflector units, said distance increasing the further a particular one of said deflector units is located from said inlet.

4. A distributor conduit as recited in claim 3, wherein: the distance separating adjacent ones of said spaced deflector members generally decreases from deflector member to deflector member in a direction away from said end opening.

5. A distributor conduit as recited in claim 4, wherein: the radial position and elevation of said deflector members are variable.

6. A distributor conduit as recited in claim 1, wherein: each of said deflector units extends into said passageway a different distance than the other of said deflector units, said distance increasing the further a particular one of said deflector units is located from said inlet.

7. A distributor conduit as recited in claim 6, wherein: said conduit body has a U-shaped cross section and the base of said U forms the top wall of said passageway, and said top wall is formed parabolically lengthwise thereof to compensate for the gravitational fall of said particle stream.

8. A distributor conduit as recited in claim 7, wherein: the distance separating adjacent ones of said spaced deflector members generally decreases from deflector member to deflector member in a direction away from said end opening.

9. A distributor conduit as recited in claim 8, wherein: the radial position and elevation of said deflector members are variable.

References Cited

FOREIGN PATENTS

| 1,012,495 | 7/1952 | France. |
| 584,809 | 1/1947 | Great Britain. |
| 914,728 | 2/1963 | Great Britain. |

ABRAHAM G. STONE, *Primary Examiner.*

J. R. OAKS, *Assistant Examiner.*